United States Patent [19]

Welch et al.

[11] Patent Number: 4,743,200
[45] Date of Patent: May 10, 1988

[54] FIBER OPTIC COUPLED HELMET MOUNTED DISPLAY SYSTEM

[75] Inventors: Brian L. Welch, Westmount, Canada; Joseph A. LaRussa, Yorktown Heights, N.Y.

[73] Assignee: CAE Electronics, Ltd., Montreal, Quebec, Canada

[21] Appl. No.: 670,913

[22] Filed: Nov. 13, 1984

[51] Int. Cl.$^4$ ........................... G09B 9/08; G09G 3/02
[52] U.S. Cl. ........................................ 434/43; 434/44; 340/705
[58] Field of Search ...................... 434/43, 44; 340/705

[56] References Cited

U.S. PATENT DOCUMENTS

| | | |
|---|---|---|
| 3,432,219 | 3/1969 | Shenker et al. |
| 3,443,858 | 5/1969 | LaRussa |
| 4,315,240 | 2/1982 | Spooner |
| 4,315,241 | 2/1982 | Spooner ................................ 434/44 |
| 4,340,878 | 7/1982 | Spooner et al. |
| 4,347,507 | 8/1982 | Spooner |
| 4,347,508 | 8/1982 | Spooner |
| 4,348,185 | 9/1982 | Breglia et al. |
| 4,348,186 | 9/1982 | Harvey et al. |
| 4,349,815 | 9/1982 | Spooner ................................ 434/44 |
| 4,439,157 | 3/1984 | Breglia et al. |
| 4,439,755 | 3/1984 | LaRussa |

OTHER PUBLICATIONS

"Fiber Optics Principles and Applications in Medicine", Siegmund, W. P. et al., Annals of the New York Academy of Sciences, vol. 157, 1969, Article 1, pp. 47–59.
"Fiber-Optics Principles and Applications, Kapany, N. S., Academic Press, New York, 1967, pp. 88–99.
The Proceedings of the 1984 Image Conference III, May 30–Jun. 1, 1984 at p. 345, et. seq., Welch and Shenker.
The Proceedings of the 1984 SID (Society for Information Display) International Symposium, Section 8.2, p. 112, Hanson and Longridge, ISSN 0097-966X, 6-1984.

Primary Examiner—William H. Grieb
Attorney, Agent, or Firm—Foley, Lardner, Schwartz, Jeffery, Schwaab, Mack, Blumenthal & Evans

[57] ABSTRACT

A fiber optic helmet mounted display system produces a replica of an image derived from an image source for viewing by an observer. The system includes a wide angle eyepiece mounted on the helmet in the line of sight of the observer. Fiber optic cable means transmit the image from the image source to the eyepiece whereby to produce the replica of the image in the line of sight of the observer, the replica appearing to originate at a distance.

7 Claims, 1 Drawing Sheet

U.S. Patent    May 10, 1988    4,743,200
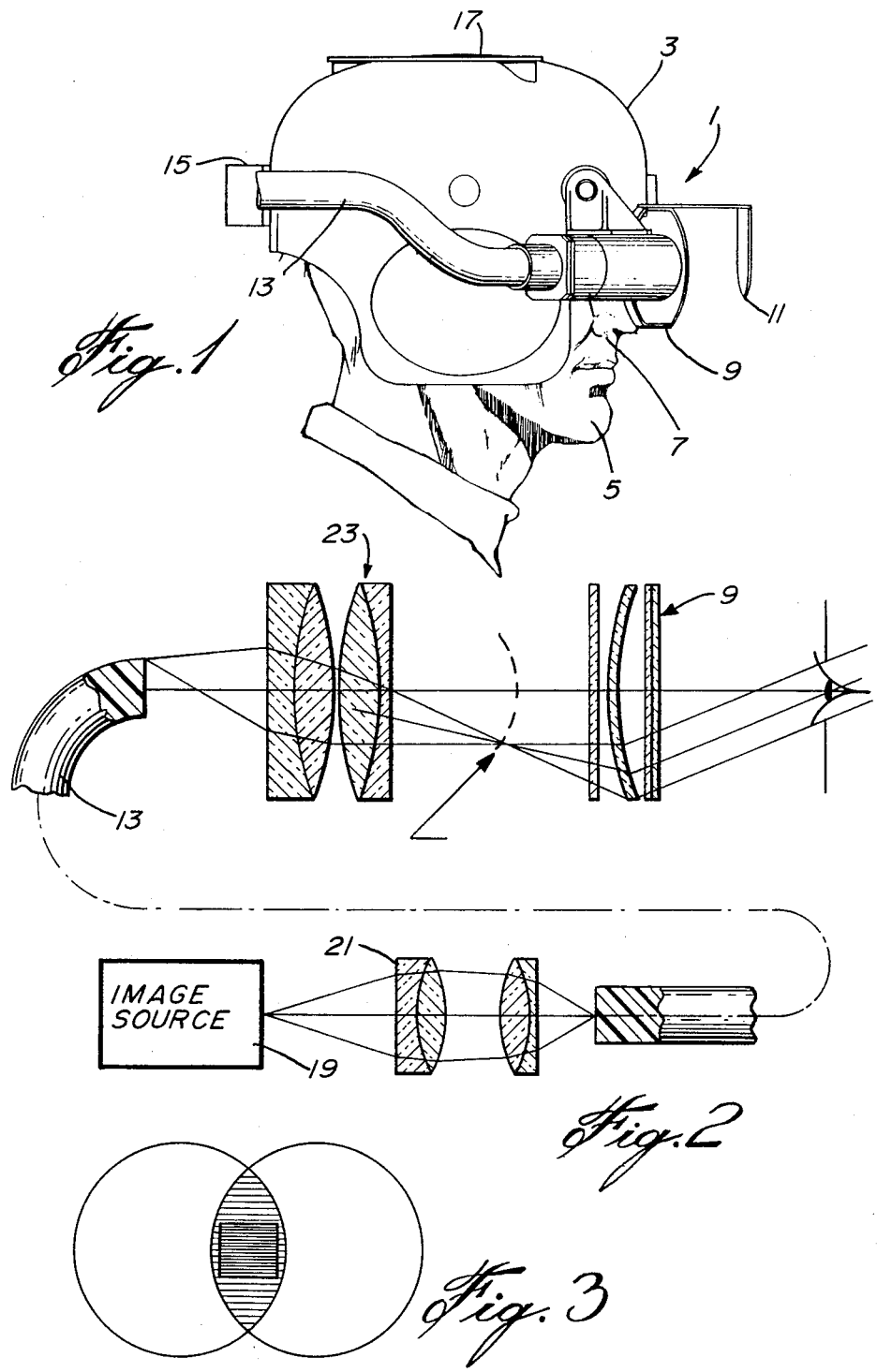

FIBER OPTIC COUPLED HELMET MOUNTED DISPLAY SYSTEM

BACKGROUND OF INVENTION

1. Field of the Invention

The invention relates to a fiber optic helmet mounted display system. More specifically, the invention relates to such a display system which uses a wide angle eyepiece.

2. Description of Prior Art

Helmet mounted display systems are known in the prior art as illustrated in, for example, U.S. Pat. Nos. 4,315,240, Spooner, Feb. 9, 1982, 4,315,241, Spooner, Feb. 9, 1982, 4,340,878, Spooner et al, July 20, 1982, 4,347,507, Spooner, Aug. 31, 1982, 4,347,508, Spooner, Aug. 31, 1982, 4,348,185, Breglia et al, Sept. 7, 1982, 4,348,186, Harvey et al, Sept. 7, 1982, 4,349,815, Spooner, Sept. 14, 1982, 4,439,157, Breglia et al, Mar. 27, 1984, 4,439,755, LaRussa, Mar. 27, 1984. In all of the above systems, except the one described in the '157 patent, an image is projected onto a screen. The requirement for a domed screen provides disadvantages as is well known in the art. In any case, none of the systems of the cited references, or any others known to Applicant, use a wide angle eyepiece as in the present application.

SUMMARY OF INVENTION

In accordance with the invention there is provided a fiber optic helmet mounted display system for producing a replica of an image derived from an image source for observation by an observer. The system includes a wide angle eyepiece mounted on the helmet in the line of sight of the observer. The fiber optic cable means transmit the image from the image source to the eyepiece. Whereby, a replica of the image is produced in the line of sight of the observer, the replica appearing to originate at infinity.

BRIEF DESCRIPTION OF DRAWINGS

The invention will be better understood by an examination of the following description, together with the accompanying drawings, in which:

FIG. 1 illustrates the helmet components;

FIG. 2 is an optical schematic for each eye; and

FIG. 3 is a typical field of view illustration in accordance with the invention.

DESCRIPTION OF PREFERRED EMBODIMENTS

Referring to FIG. 1, the display system, illustrated generally at 1, is mounted on a helmet 3 worn by an observer 5. The observer can be the pilot, or any other crew member, of a flight simulation device. Alternatively, it could be the crew member or an observer in an operational vehicle such as a helicopter, fixed wing aircraft, space shuttle, tank or ship.

The display system comprises an optical assembly 7, a wide angle eyepiece 9 and a beam splitter 11. The wide angle eyepiece can comprise a PANCAKE WINDOW TM as described in U.S. Pat. No. 3,443,858, LaRussa, May 13, 1969 or a wide field optical viewer with concave eyepiece as described in U.S. Pat. No. 3,432,219, Shenker et al, Mar. 11, 1969. The image sources are coupled to the wide angle eyepiece by coherent fiber optic cables 13. Other features of the invention may include an accelerometer package 15 and a diode array 17.

Turning now to FIG. 2, the image is provided by image source 19. In a simulator situation, the image would be generated by a computational device capable of transforming a digital data base into a real world scene. Alternatively, the image could originate from a film, model board, video disc or any other medium capable of storing a representation of the environment which would surround the observer in the real world.

In the case of operational vehicles, the image would be provided by a remote sensor such as a television camera or a thermal imaging device or a computational device capable of generating the required imagery.

In accordance with a preferred embodiment, the image transmitted by the fiber optic cable is enhanced either by wavelength multiplexing or dynamic scanning. Wavelength multiplexing is described in Fiber Optics Principles and Applications in Medicine, Siegmund, W. P. et al, Annals of the New York Academy of Sciences, Vol. 157, 1969, while dynamic scanning is described in Fiber-Optics Principles and Applications, Kapany, N. G., Academic Press, New York, 1967. In both techniques, a single picture element or pixel is distributed over many individual fibres at the input end of the cable and is recombined at the output end of the cable. Both techniques increase the resolution of the fiber optic cables and reduce the visibility of the fiber optic structure.

Relay lens 21 is provided to re-image the output of the image source onto the input of the fiber optic cable 13. Relay lens 23 produces an serial image 24 of the output of the fiber optic cable. The aerial image 24 is viewed by the eyepiece 9 to form a collimated image to the eye of the observer. The image appears to originate at a distance as shown by dotted lines 26. As is known in the art, a relay lens is a lens which re-images an input to a different location.

The output relay lens 23 forms a part of the optical assembly 7, and, as seen in FIG. 1, both the optical assembly and the eyepiece are mounted on the observer's head. The image source 19 and the input relay lens 21 are mounted a short distance from the observer and, as seen in FIG. 2, are coupled to the observer's head by the fiber optic cable 13.

In the preferred mode of operation, the beam splitter 11 of FIG. 1 is inserted in the optical path between the wide angle eyepiece 9 and the optical assembly 7. The beam splitter permits the optical assembly to be placed out of the direct line of sight of the observer whereby the collimated view of the replica of the image carried by the fiber optic cable can be combined with the direct view of objects seen through the eyepiece, and the replica of the image still appears to originate at a distance. Such an arrangement allows the observer to see his immediate environment, such as a cockpit instrument panel for a pilot, as well as the replica of the image.

The diode array 17 and the accelerometer package 15 determine the position of the head of the observer. Alternative schemes, well known in the art, can also be used.

In order to provide as wide a field of view as possible the optical axis of each eyepiece is inclined outward such that the displayed field of view is as shown in FIG. 3. The amount of overlap can be varied for particular applications.

Due to the difficulty and cost of providing high resolution imagery over the entire displayed field of view, a small high resolution inset is normally used as shown in FIG. 3. In the simplest mode of operation, this inset is fixed in the central portion of the field of view such that an observer, by turning his head towards an object of interest, will see it in high resolution.

An alternative mode of operation causes the inset to be slaved to a particular item of interest.

In a third, and most advantageous, mode the inset is slaved to the observer's eye position. In this mode, due to the characteristics of the human visual system, the entire displayed field of view is perceived by the observer as if it were all displayed in high resolution. An occulometer, capable of measuring the observer's eye position with sufficient accuracy and speed of response, is mounted on the helmet for this mode of operation in addition to the diode array and accelerometer package which monitor the position of the helmet.

The inset image may be obtained from a separate image source which, after appropriate magnification, would be optically combined with the background image either at the input end of the fiber optic cable or, if a separate fiber optic cable is used for the inset, in the optical assembly 7 of FIG. 1. Alternatively, a single image source, having the ability to display that part of the image corresponding to the inset in higher resolution than the remainder of the image, may be used. In the modes where the inset is slaved to either the eye position or an object of interest, a servo mechanism, or an electronic technique, may be used to move the inset in an appropriate manner.

It is noted that the operation of the system herein is described in The Proceedings of the 1984 Image Conference III, May 30–June 1, 1984 at page 345, et. seq., Welch and Shenker and The Proceedings of the 1984 SID (Society for Information Display) International Symposium, Section 8.2, page 112, Hanson and Longridge, ISSN 0097-966X, the contents of which documents are incorporated herein by reference.

Although particular embodiments have been above-described, this was for the purpose of illustrating, but not limiting, the invention. Various modifications, which will come readily to the mind of one skilled in the art, are within the scope of the invention as defined in the appended claims.

We claim:

1. A fiber optic helmet mounted display system for producing a replica of an image derived from an image source for observation by an observer, comprising:
   a first relay lens having an input;
   fiber optic cable means having an input end and an output end;
   said first relay lens being disposed between said source and the input end of said fiber optic cable means;
   a second relay lens disposed at the output end of said fiber optic cable means; and
   a wide angle eyepiece;
   said second relay lens being disposed between the output end of said fiber optic cable means and said wide angle eyepiece;
   whereby said fiber optic cable means transmits said image from said image source to said eyepiece;
   whereby to produce said replica of said image in the line of sight of said observer and, said replica appearing to originate at a distance.

2. A system as defined in claim 1 and further including image enhancement means;
   whereby a single picture element or pixel of said image is distributed over any individual fibers of said fiber optic cable at the input end of the cable by said first relay lends, and recombined at the output end of said cable by said second relay lens.

3. A system as defined in claim 2 and further including a beam splitter in the optical path between said eyepiece and said second relay lens.

4. A system as defined in claim 3 wherein said eyepiece comprises a PANCAKE WINDOW TM.

5. A system as defined in claim 3 wherein said eyepiece comprises a wide field optical viewer with concave eyepiece.

6. A system as defined in claim 4 and having means for producing a low resolution wide field replica and a high resolution inset.

7. A system as defined in claim 5 and having means for producing a low resolution wide field replica and a high resolution inset.

* * * * *